(12) United States Patent
Yoshikawa et al.

(10) Patent No.: US 8,678,864 B2
(45) Date of Patent: Mar. 25, 2014

(54) TERMINAL BOX FOR SOLAR CELL MODULE

(75) Inventors: Hiroyuki Yoshikawa, Yokkaichi (JP); Makoto Higashikozono, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 16 days.

(21) Appl. No.: 13/580,475

(22) PCT Filed: May 25, 2011

(86) PCT No.: PCT/JP2011/061993
§ 371 (c)(1), (2), (4) Date: Aug. 22, 2012

(87) PCT Pub. No.: WO2012/098701
PCT Pub. Date: Jul. 26, 2012

(65) Prior Publication Data
US 2012/0314356 A1   Dec. 13, 2012

(30) Foreign Application Priority Data
Jan. 20, 2011   (JP) ................................. 2011-010113

(51) Int. Cl.
H01R 13/68   (2011.01)

(52) U.S. Cl.
USPC ...... 439/709; 439/76.2; 439/712; 439/620.21

(58) Field of Classification Search
USPC ............... 439/620.21, 620.09, 76.2, 709, 712
See application file for complete search history.

(56) References Cited

U.S. PATENT DOCUMENTS

| | | | |
|---|---|---|---|
| 7,365,965 B2* | 4/2008 | Higashikozono et al. | 361/641 |
| 7,369,398 B2* | 5/2008 | Higashikozono et al. | 361/641 |
| 7,444,743 B2* | 11/2008 | Feldmeier et al. | 29/748 |
| 7,955,133 B2* | 6/2011 | Scheele et al. | 439/620.27 |
| 8,128,439 B2* | 3/2012 | Feldmeier et al. | 439/709 |

FOREIGN PATENT DOCUMENTS

| | | |
|---|---|---|
| JP | 11-26035 | 1/1999 |
| JP | 2000-299485 | 10/2000 |
| JP | 2004-63651 | 2/2004 |
| JP | 2006-351606 | 12/2006 |
| JP | 2009-302590 | 12/2009 |
| WO | 2009/129405 | 10/2009 |
| WO | 2010/047122 | 4/2010 |

* cited by examiner

*Primary Examiner* — Gary Paumen
(74) *Attorney, Agent, or Firm* — Gerald E. Hespos; Michael J. Porco; Matthew T. Hespos (57) ABSTRACT

A terminal box (10) includes terminal plates (90), a base plate (21) for supporting the terminal plates (90) and an outer plate (22) surrounding the base plate (21). The base plate (21) has higher heat resistance than the outer plate (22) and is mounted and fixed to the outer plate (22). The outer plate (22) is formed integrally with pressing pieces (33) for preventing the lifting of the terminal plates (90) from the base plate 21 by being arranged to be able to come into contact with the outer surfaces of the terminal plates (90) as the base plate (21) is mounted.

13 Claims, 6 Drawing Sheets

TERMINAL BOX FOR SOLAR CELL MODULE

BACKGROUND OF THE INVENTION

1. Field of the Invention

The present invention relates to a terminal box for solar cell module.

2. Description of the Related Art

A terminal box for solar cell module (hereinafter, terminal box) disclosed in Japanese Unexamined Patent Publication No. 2009-302590 includes a plurality of terminal plates, a diode connected to two corresponding terminal plates, a bottom wall which supports the terminal plates and the diode and a peripheral wall which surrounds the bottom wall. The peripheral wall is integrally formed to stand from a peripheral edge part of the bottom wall. Further, the diode includes a heating body. When the heating body generates heat, this heat is radiated from the terminal plates toward a solar cell panel via the bottom wall.

Resiliently deformable resilient locking pieces are integrally formed to stand on the bottom wall. In the process of placing the terminal plates on the bottom wall, the resilient locking pieces interfere with the terminal plates to be resiliently deformed. When the terminal plates are placed on the bottom wall, the resilient locking pieces are resiliently restored and tip claws of the resilient locking pieces are arranged to be able to lock the terminal plates. In this way, the lifting of the terminal plates from the bottom wall is prevented.

In the above conventional terminal box, the bottom wall may be possibly thermally damaged due to heat generation of the diode. Then, the resilient locking pieces integrally formed on the bottom wall may be deformed to reduce a force for holding the terminal plates.

In view of this, for example, a method for preventing the lifting of the terminal plates by placing a pressing plate separate from the bottom wall on the terminal plates was thought. However, in this case, there has been a problem of increasing cost since the pressing plate is separately necessary.

The present invention was developed in view of the above situation and an object thereof is to reliably prevent the lifting of terminal plates while suppressing a cost increase.

SUMMARY OF THE INVENTION

The present invention is directed to a terminal box for solar cell module to be attached to a solar cell module, comprising a plurality of terminal plates; a rectifying element which is connected to two corresponding ones of the terminal plates and includes a heating part; a base plate which is in the form of a flat plate for supporting the terminal plates and the rectifying element; an outer plate which has lower heat resistance than the base plate and is in the form of a frame surrounding the base plate and to which the base plate is mounted and fixed; and a pressing piece which is united with the outer plate and can come into contact with the outer surfaces of the terminal plates as the base plate is mounted to the outer plate, thereby preventing the lifting of the terminal plates from the base plate.

When the outer plate is mounted to the base plate, the pressing piece is arranged to be able to come into contact with the outer surfaces of the terminal plates, thereby preventing the lifting of the terminal plates. In this case, since the pressing piece is integrally formed to the outer plate, a cost increase is suppressed as compared with the case where the pressing piece is formed separately from the outer plate and the base plate. Further, since the outer plate has lower heat resistance than the base plate, in other words, the base plate has higher heat resistance than the outer plate, thermal damage of the base plate can be avoided even if the heating part of the rectifying element generates heat. Further, the outer plate not supporting the rectifying element is hardly thermally damaged, wherefore the deformation of the pressing piece is prevented. As a result, the lifting of the terminal plates can be reliably prevented by the pressing piece.

A pressing area of the terminal plate covered by the pressing piece may be equal to or more than half the entire area of the terminal plate in a width direction. This reliably prevents the lifting of the terminal plates.

The terminal plates may be held between the pressing piece and the base plate in a state where the base plate is mounted to the outer plate. This causes the terminal plates to be positioned and held.

The base plate may be slid and mounted to the outer plate. According to this, the base plate is easily mounted to the outer plate.

The terminal plates may be placed on left and right supporting areas of the base plate, the outer plate may be defined by both left and right side walls and front and rear walls, the base plate may be slidable in forward and backward directions relative to the outer plate, and the pressing piece may project into an internal space from the inner surface of each of the both side walls. If this configuration is adopted, the left and right terminal plates are more stably held by the corresponding pressing pieces.

One of the respective terminal plates may serve as a heat radiation plate which has a larger surface area than the other terminal plate and supports the rectifying element, and one of the respective pressing pieces may have a larger width in forward and backward directions than the other pressing piece and prevent the lifting of the heat radiation plate. By doing so, the heat radiation plate is more reliably held by the larger pressing piece.

The base plate may be formed with a slide portion, the outer plate may be formed with a slide receiving portion which slides along the slide portion at the time of sliding and mounting the base plate, and the pressing piece may be integrally coupled to the slide receiving portion. If this configuration is adopted, space efficiency is excellent and the entire configuration is simplified.

The base plate may be formed with projections, each terminal plate may be formed with a hole, a leading end part of each projection may be inserted into the hole to come out at the outer side of the terminal plate and deformed by applying resin caulking to form a resin caulked portion for holding the terminal plate between the resin caulked portion and the base plate, and the resin caulking may be applied in a state where the lifting of the terminal plates is prevented by the pressing piece. Since the terminal plates are positioned by the pressing piece while the resin caulking is applied, an operation of the resin caulking can be smoothly performed.

The base plate may be made of at least one material selected from PBT (polybutylene terephthalate) and PPS (polyphenylene sulfide). This reliably prevents the base plate from being thermally damaged and deformed.

The outer plate may be made of at least one material selected from PPO (polyphenylene oxide), PPE (polyphenylene ether) and PVC (polyvinyl chloride). According to this, the outer plate is excellent in weather resistance and hydrolysis resistance. Further, by forming the base plate and the outer plate in an appropriate function-sharing manner, the quality of the terminal box is improved.

According to the present invention, it is possible to obtain a terminal box for solar cell module configured to suppress a cost increase and prevent the lifting of terminal plates.

DETAILED DESCRIPTION OF THE PREFERRED EMBODIMENT

An embodiment of the present invention is described with reference to FIGS. 1 to 9. A terminal box for solar cell module (hereinafter, referred to as a terminal box 10) according to the embodiment includes a box main body 20, a plurality of terminal plates 90 and one bypass diode (which is a heating element and, hereinafter, referred to as a diode 80).

The box main body 20 is made of synthetic resin and in the form of a plate box as a whole and includes a rectangular base plate 21 and an outer plate 22 surrounding the base plate 21. The base plate 21 forms the bottom wall of the box main body 20 and the outer plate 22 forms the peripheral wall of the box main body 20. The base plate 21 is removably slid and mounted to the outer plate 22 to be fixed.

Figure 1:
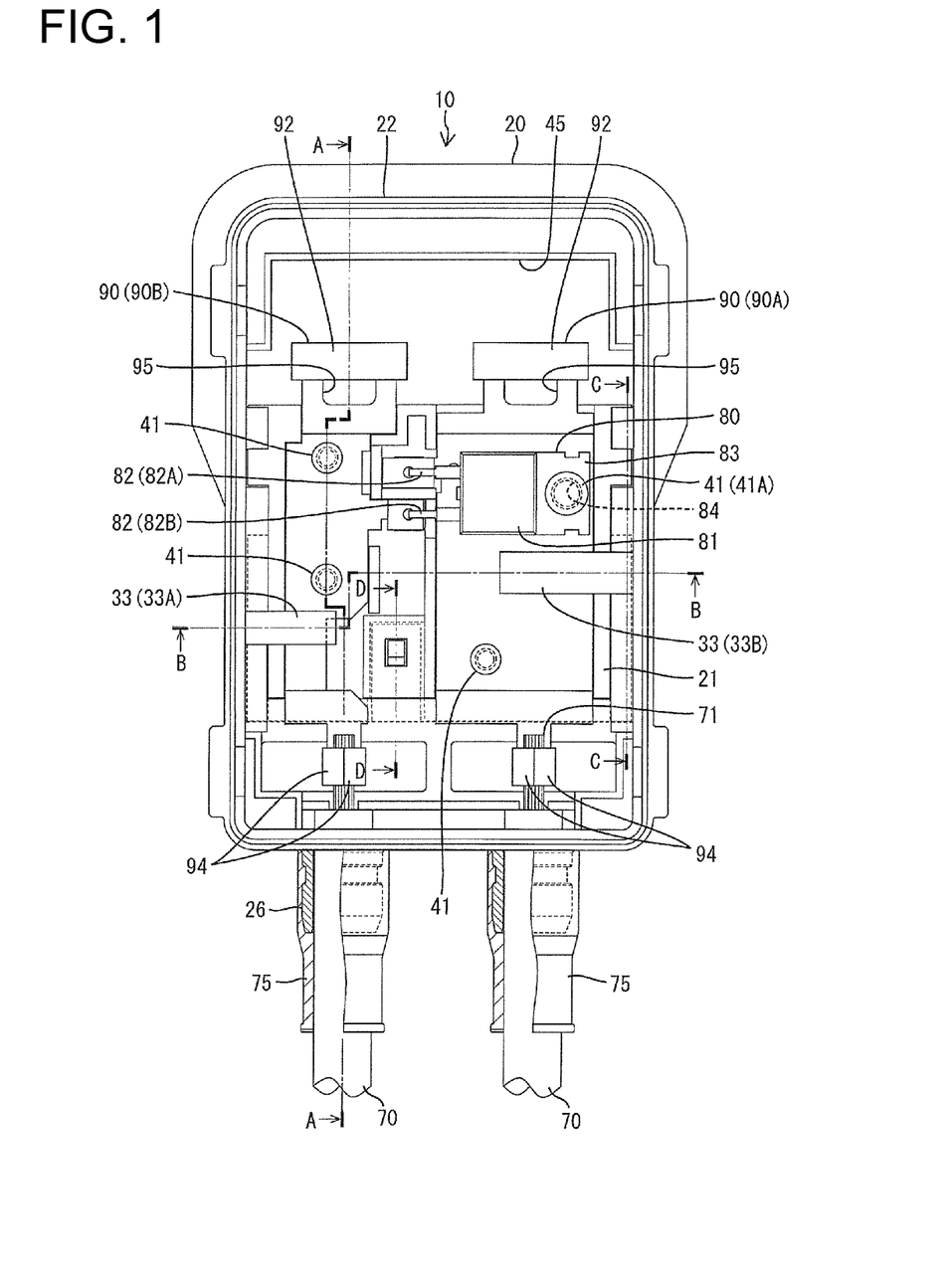
FIG. 1 is a plan view of a terminal box for solar cell module according to an embodiment of the present invention.
Figure 2:
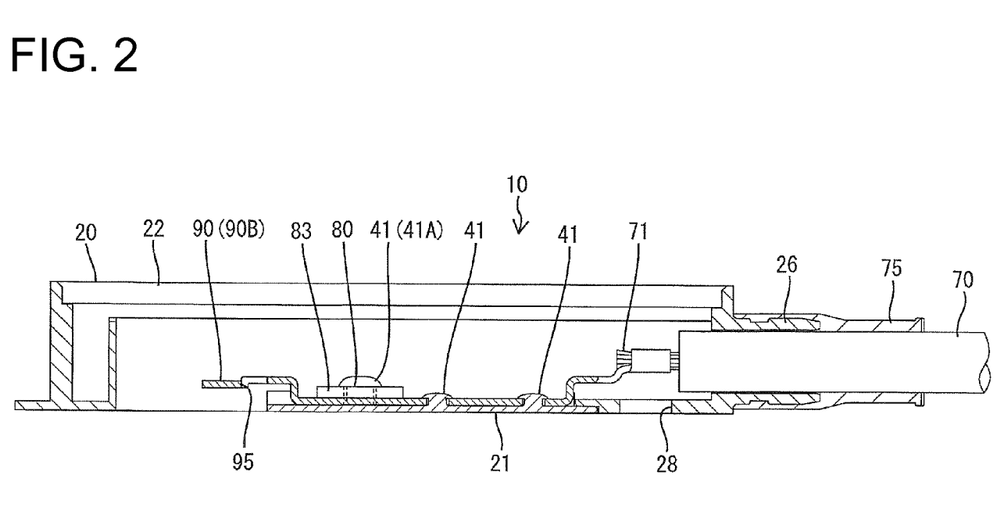
FIG. 2 is a section along A-A of FIG. 1.
Figure 9:
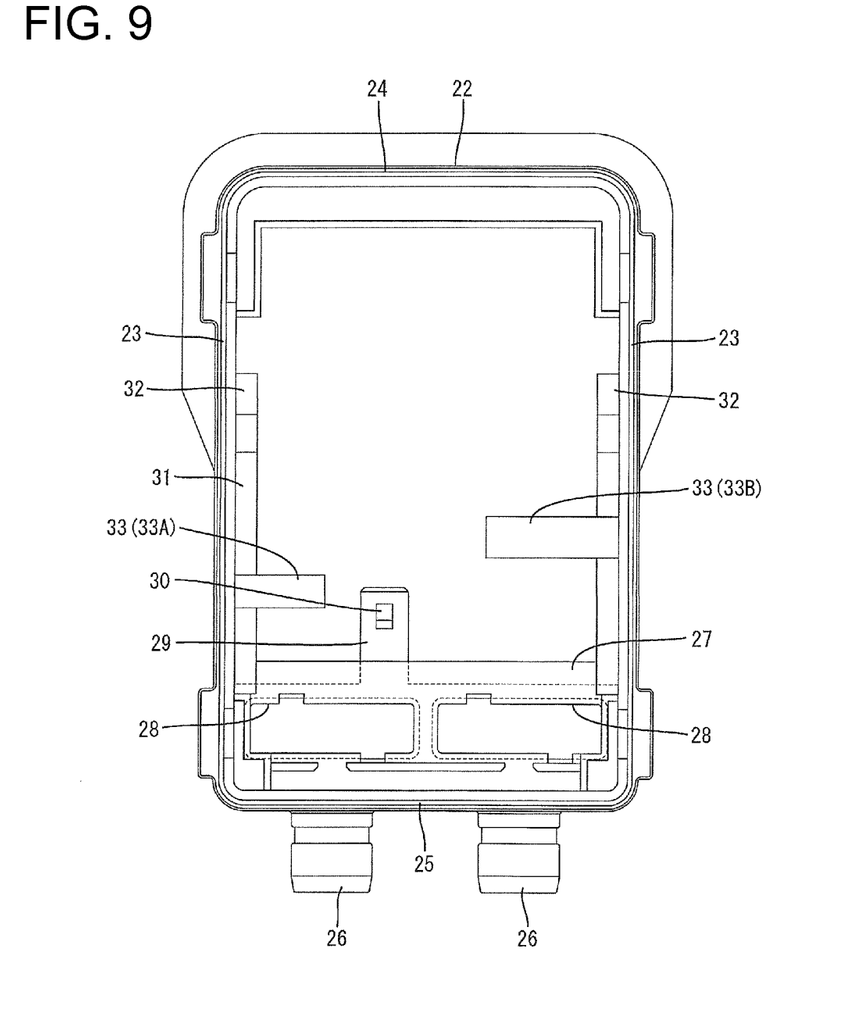
FIG. 9 is a plan view of an outer plate.

The outer plate 22 is in the form of a rectangular frame standing from a peripheral edge part of the base plate 21 and includes a pair of left and right side walls 23 and front and rear walls 24, 25 as shown in FIG. 9. The rear wall 25 is formed with a pair of left and right cable inserting portions 26. The respective cable inserting portions 26 have a cylindrical shape projecting backward through the rear wall 25, and positive and negative cables 70 are respectively inserted thereinto from behind. As shown in FIGS. 1 and 2, a rubber tube 75 is mounted on the cable inserting portion 26. The tube 75 is closely mounted on the cable inserting portion 26 and the cable 70, thereby sealing the both in a liquid-tight manner.

A closure plate 27 for partly closing an internal space defined by the both side walls 23 and the front and rear walls 24, 25 is formed at a rear end part of the box main body 20. The closure plate 27 is connected to the respective inner surfaces of the rear wall 25 and the both side walls 23 and arranged substantially in parallel to the base plate 21. A pair of left and right jig insertion holes 28 are formed to penetrate through the closure plate 27.

Here, a core 71 is exposed at an end portion of the cable 70. A barrel piece (to be described later) of the terminal plate 90 is crimped and connected to the core 71. In crimping and connecting the barrel piece to the core 71, the barrel piece is deformed by a jig composed of unillustrated anvil (lower die) and crimper (upper die) and, in this state, wound around the core 71. In this case, the jig is inserted into the box main body 20 through the jig insertion hole 28 of the closure plate 27.

A plate-like resilient locking piece 29 is formed to project forward at a position on the front end edge of the closure plate 7 slightly shifted toward one side from the widthwise center. A locking projection 30 is formed to project on the upper surface of the resilient locking piece 29. The resilient locking piece 29 functions to prevent the separation of the base plate 21 from the outer plate 22 by locking the base plate 21 mounted to the outer plate 22.

Figures 4, 5:
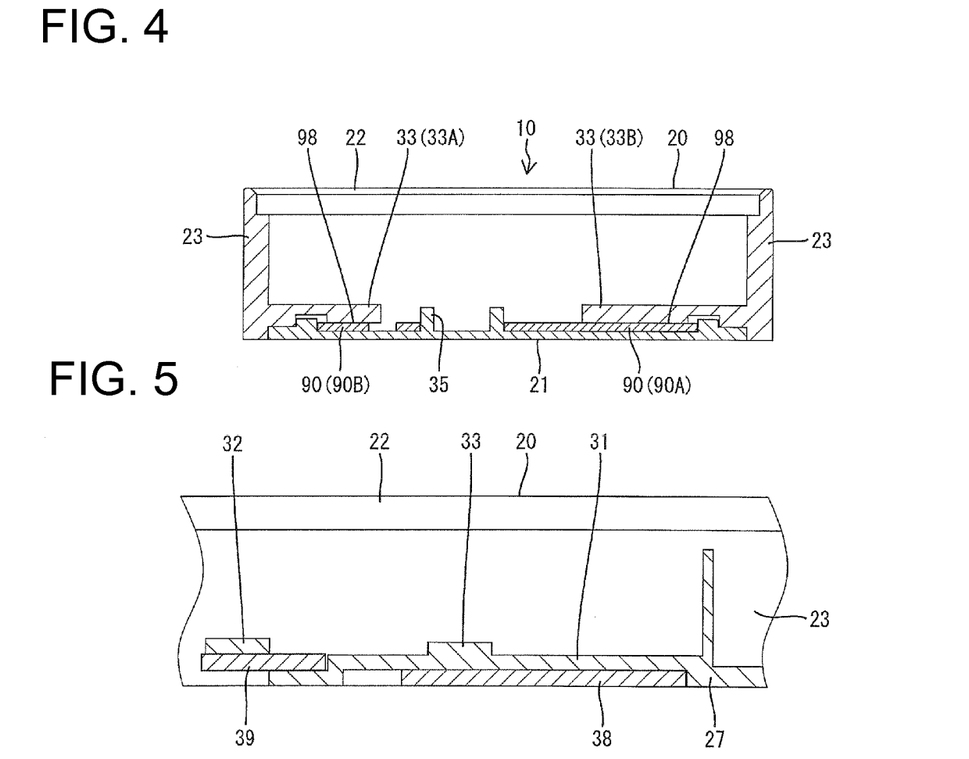
FIG. 4 is a section along B-B of FIG. 1.
FIG. 5 is a section along C-C of FIG. 1.

A first and a second slide receiving portions 31, 32 which can slide along a first and a second slide portions 38, 39 of the base plate 21 (to be described later) are formed to extend in forward and backward directions on the inner surface of each of the both side walls 23. As shown in FIG. 5, the first slide receiving portion 31 extends forward from a front end part of the closure plate 27 and a front end part thereof is located slightly lower. The second slide receiving portion 32 extends straight forward from substantially the same position as the front end of the first slide receiving portion 31 in forward and backward directions and is arranged at a position slightly higher than the first slide receiving portion 31. The second slide receiving portion 32 is shorter than the first slide receiving portion 31.

Pressing pieces 33 capable of pressing the terminal plates 90 from above are formed on the inner surfaces of the both side walls 23 to project into the internal space. The respective pressing pieces 33 are in the form of rectangular plates long and narrow in a width direction, integrally coupled to the upper surfaces of the first slide receiving portions 31 and arranged across the first slide receiving portions 31. Out of these pressing pieces 33, the pressing piece 33A on one widthwise side has a smaller width in forward and backward directions than the pressing piece 33B on the other widthwise side and is arranged more backward than the pressing piece 33B on the other widthwise side. Note that the pressing piece 33A on the one widthwise side is arranged at a position to overlap a front end part of the resilient locking piece 29 in forward and backward directions. As shown in FIG. 4, the pressing pieces 33 can press areas (pressing areas 98) of the terminal plates 90 equal to or more than halves the entire areas of the terminal plates 90 in the width direction.

The outer plate 22 is made of at least one material selected from PPO (polyphenylene oxide), PPE (polyphenylene ether) and PVC (polyvinyl chloride). That is, the outer plate 22 is made of a material excellent in weather resistance and hydrolysis resistance.

Figure 7:
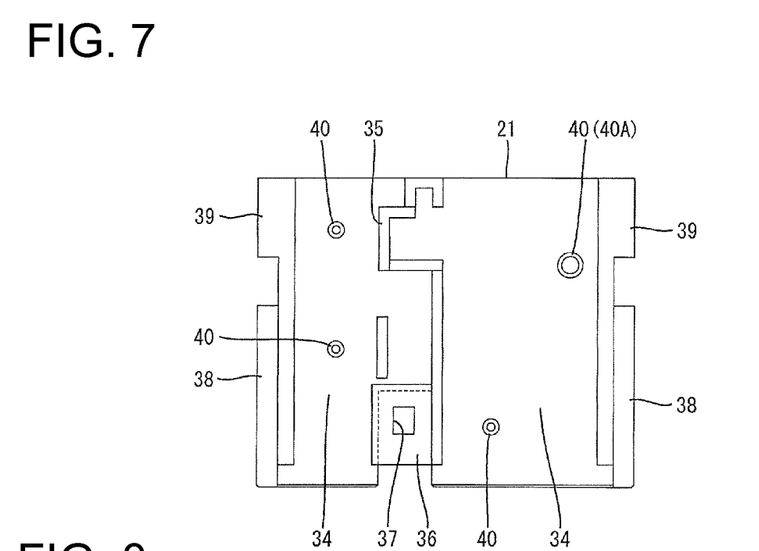
FIG. 7 is a plan view of a base plate.

As shown in FIG. 7, the base plate 21 is in the form of a rectangular flat plate as a whole. On the upper surface of the base plate 21, supporting areas 34 for supporting the terminal plates 90 are formed on left and right sides. A partition wall 35 partitioning between the respective terminal plates 90 is formed to stand between the left and right supporting areas 34 on the upper surface of the base plate 21. The partition wall 35 is cranked at intermediate positions along the outer edges of the terminal plates 90.

Further, an engaging portion 36 is formed at a position of the base plate 21 connected to a rear end part of the partition wall 35 and shifted toward one widthwise side. The engaging portion 36 has a rectangular shape and is open backward when viewed from above, and the resilient locking piece 29 can be received thereinto from behind. A rectangular locking hole 37 into which the locking projection 30 is fittable is formed in the upper surface of the engaging portion 36.

The first and second slide portions 38, 39 are formed to extend in forward and backward directions on both left and right edges of the base plate 21. The first slide portions 38 extend straight forward from the rear end of the base plate 21. The second slide portions 39 extend straight backward from the front end of the base plate 21 and spaced away from the first slide portions 38. The second slide portions 39 are arranged at positions slightly higher than the first slide portions 38 and shorter than the first slide portions 38.

A plurality of projections 40 are formed on the upper surface of the base plate 21. The respective projections 40 have a substantially cylindrical shape and two front and rear projections 40 are arranged in each of the left and right supporting areas 34. Out of the projections 40, the one located on the front side of the other widthwise side is a projection having a larger diameter than the other projections 40.

The above base plate 21 is made of at least one material selected from PBT (polybutylene terephthalate) and PPS (polyphenylene sulfide). The base plate 21 contains a reinforcing material such as glass fibers or talc. Thus, heat distortion temperature of the base plate 21 is at least 170° C. or higher and, preferably, adjusted to 200° C. or higher. That is, the outer panel 21 is made of a material excellent in heat resistance. This enables the base plate 21 to avoid deformation caused by heat generation of the diode 80.

Figure 8:
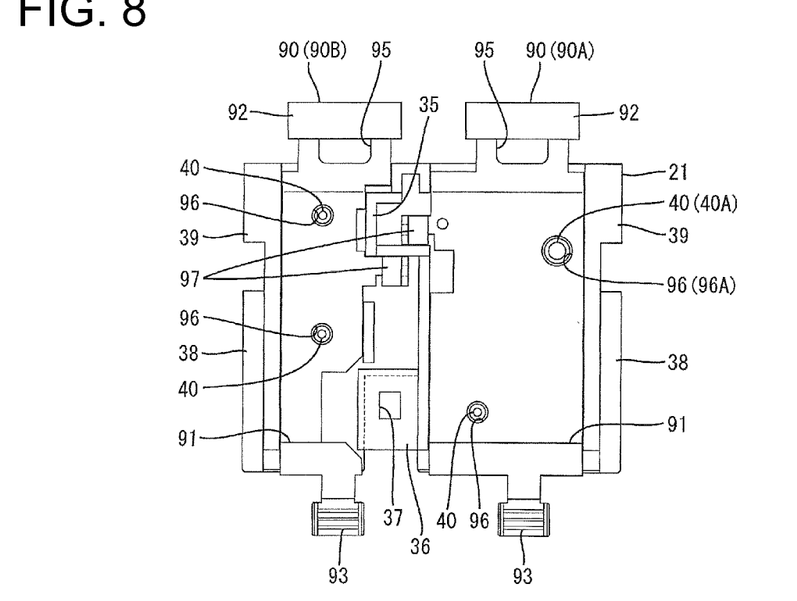
FIG. 8 is a plan view of the base plate supporting terminal plates.

The terminal plates 90 are in the form of flat plates made of electrically conductive metal and respectively placed on the left and right supporting areas 34 of the base plate 21 as shown in FIG. 8. Intermediate parts of the terminal plates 90 in forward and backward directions are slightly lower than both front and rear end parts and include step portions 91 at boundaries with the both front and rear end parts. Lead connecting portions 92 are formed to project forward at the front end parts of the terminal plates 90, and cable connecting portions 93 are formed to project backward at the rear end parts of the terminal plates 90.

The cable connecting portion 93 is formed with a pair of barrel pieces 94 to be connected to the positive or negative cable 70 for external connection. The lead connecting portion 92 is formed with a connection hole 95 into which an end portion of a lead extending from an electrode of the unillustrated solar cell module is inserted for connection.

Further, out of the respective terminal plates 90, the one located on the other widthwise side serves as a heat radiation plate 90A which supports the diode 80 and radiates heat generated by the diode 80. The heat radiation plate 90A has a larger surface area than the adjacent other terminal plate 90B, thereby ensuring good heat radiation.

Holes 96 into which the respective projections 40 are insertable are formed to penetrate through the respective terminal plates 90. The respective holes 96 are arranged while being spaced apart from each other on both front and rear sides of the terminal plates 90. Out of the respective holes 96, the one located on the front side of the other widthwise side is a large-diameter hole 96A which has a larger opening diameter than the other holes 96 and can receive the large-diameter projection 40A.

As shown in FIG. 1, the diode 80 includes a diode main body 81 formed by resin molding a chip portion (not shown) into a rectangular block and a pair of anode and cathode connection pins 82 projecting in the width direction from one side of the diode main body 81. The diode main body 81 serves as a heating part whose temperature increases to 170° C. to the vicinity of 200° C. by the rectification action of the chip portion.

The respective connection pins 82 are arranged substantially parallel to each other. Out of these, a leading end part of one connection pin 82A is soldered to the heat radiation plate 90A, and that of the other connection pin 82B is soldered to the adjacent terminal plate 90B. The other connection pin 82B is arranged to cross over the partition wall 35. Connection pieces 97 on which the leading end parts of the connection pins 82 are to be placed are formed to project in the width direction on the lateral edges of the respective terminal plates 90 (see FIG. 8).

A mounting piece 83 in the form of a flat plate is formed on a side of the diode main body 81 opposite to the side where the respective connection pins 82 are arranged. A mounting hole 84 into which the large-diameter projection 40A is insertable is formed in the mounting piece 83.

Here, the respective projections 40 are inserted into the holes 96 of the terminal plates 90 and, in this state, resin caulking (e.g. heat caulking) is applied to the leading end parts thereof projecting upward from the surfaces of the terminal plates 90, whereby the leading end parts are squashed to become resin caulked portions 41. The resin caulked portions 41 are in the form of radially expanding flanges and function to hold the terminal plates 90 between the base plate 21 and the resin caulked portions 41. In this case, the large-diameter projection 40A is inserted into the mounting hole 84 of the diode 80 through the large-diameter hole 96A of the terminal plate 90 and, in this state, resin caulking is applied to the leading end part thereof projecting upward form the outer surface of the mounting piece 83, whereby the leading end part is squashed to become a large-diameter resin caulked portion 41A.

Next, an assembling method, functions and effects of the terminal box 10 according to this embodiment are described.

First, the terminal plates 90 are fitted to be supported on the corresponding supporting areas 34 of the base plate 21. When the respective terminal plates 90 are supported on the base plate 21 as shown in FIG. 8, the leading end parts of the respective projections 40 project upward from the holes 96 of the terminal plates 90 and the leading end part of the large-diameter projection 40A projects upward from the large-diameter hole 96A of the heat radiation plate 90A. In this way, the respective terminal plates 90 are positioned and supported on the supporting areas 34 of the base plate 21.

Figure 6:
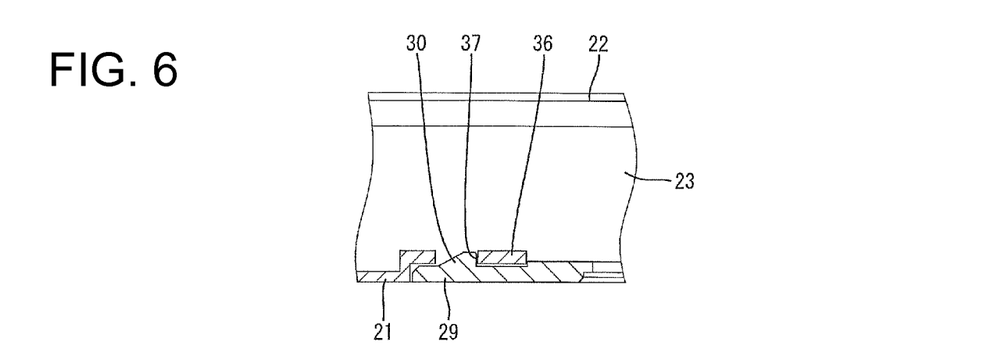
FIG. 6 is a section along D-D of FIG. 1.

In assembling the box main body 20, the base plate 21 is slid backward relative to the outer plate 22 from a lower front side of the outer plate 22. In the sliding process, the upper surfaces of the first slide portions 38 slide along the lower surfaces of the first slide receiving portions 31 and the second slide portions 39 slide along the lower surfaces of the second slide receiving portions 32 and the upper surfaces of the first slide receiving portions 31 to be inserted between the first and second slide receiving portions 31, 32. When the sliding process is completed, the first and second slide portions 38, 39 are held in contact with the step portions of the first slide receiving portions 31 as shown in FIG. 5, whereby any further sliding movement is prevented. Further, when the sliding process is completed, the resilient locking piece 29 is inserted into the engaging portion 36 and the locking projection 30 is resiliently fitted into the locking hole 37 as shown in FIG. 6.

In a state where the base plate 21 is mounted and fixed to the outer plate 22 in this way, the terminal plates 90 are held in contact with the pressing pieces 33 from below, whereby the lifting of the terminal plates 90 is prevented. At this time, the terminal plates 90 are held between the pressing pieces 33 and the base plate 21.

Further, in the state where the base plate 21 is mounted and fixed to the outer plate 22, a substantially rectangular window portion 45 is defined between the front end of the base plate 21 and the front wall 24 of the outer plate 22. The lead connecting portions 92 of the respective terminal plates 90 are arranged in this window portion 45.

Figure 3:
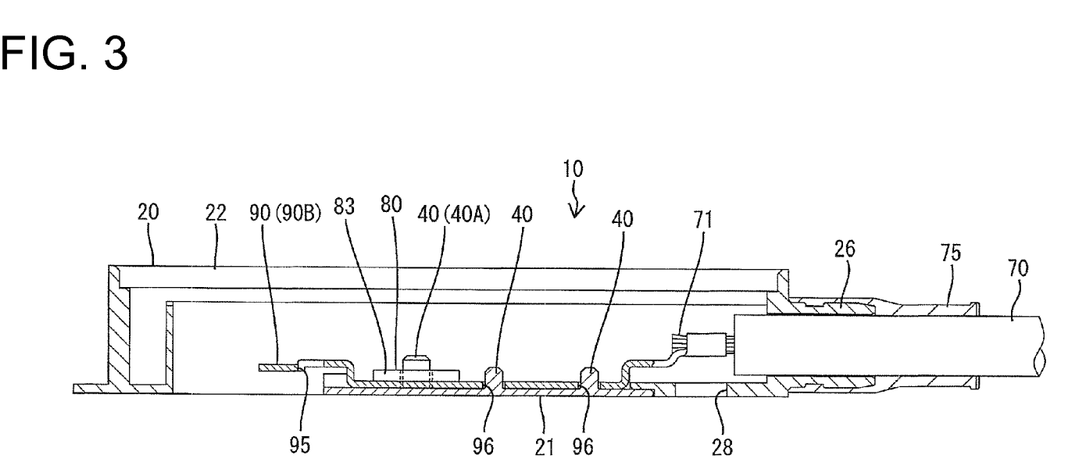
FIG. 3 is a section corresponding to FIG. 2 before resin caulking.

Subsequently, an unillustrated heated die is pressed against the leading end part of each projection 40 to squash the leading end part of each projection 40. Then, as shown in FIGS. 2 and 3, the leading end parts of the respective projections 40 are widened to form the resin caulked portions 41, the terminal plate 90 is tightly held and fixed between the resin caulked portion 41 and the base plate 21 and the terminal plate 90 and the diode 80 are tightly held and fixed between the large-diameter resin caulked portion 41A and the base plate 21. At this time, the resin caulked portions 41 adhere to the outer surfaces of the terminal plates 90 and the large-diameter resin caulked portion 41A adheres to the outer surface of the mounting piece 83 of the diode 80.

Further, the cables 70 are inserted into the cable inserting portions 26 from behind at appropriate timings and the cable connecting portions 93 of the terminal plates 90 are crimped and connected to the cores 71 at the end portions of the cables 70 via the jig insertion holes 28.

Thereafter, the lower surface of the base plate 21 is attached to the underside of the solar cell module by an attaching means such as an adhesive material, a double-faced adhesive tape or bolts. At the time of attachment, the end portions of the leads extending from the solar cell module are pulled into the box main body 20 through the window portion 45 and soldered to the lead connecting portions 92 of the respective terminal plates 90. Further, a sealing material made of insulating resin such as silicon resin is poured into the box main body 20 from above. When the sealing material is cured, the connected part of the respective terminal plates 90 and the cables 70, those of the respective terminal plates 90 and the leads and those of the respective terminal plates 90 and the diode 80 are resin-sealed. Finally, an unillustrated cover is mounted on the box main body 20 from above, whereby the terminal box 10 is completed.

When the diode main body 81 of the diode 80 is heated during use, the heat is radiated from the heat radiation plate 90A toward the solar cell module via the base plate 21. In this case, since the base plate 21 is made of the material excellent in heat resistance and heat conductivity such as PBT (polybutylene terephthalate) containing a reinforcing material, plastic deformation of the base plate 21 and, consequently, of the resin caulked portions 41 due to thermal influence from the diode 80 is avoided. As a result, the resin caulked portions 41 and the terminal plates 90, and the large-diameter resin caulked portion 41A and the diode 80 are properly kept in a sealed state to ensure good heat conductivity to the solar cell module.

As described above, according to this embodiment, the following effects can be achieved.

Since the resin caulked portions 41 (41A) are formed by applying resin caulking to deform the leading end parts of the projections 40 (40A) and the diode 80 is held between the resin caulked portion 41 (41A) and the base plate 21, a method other than screw fastening is adopted in fixing the diode 80. Further, since the base plate 21 has higher heat resistance than the outer plate 22 and the projections 40 (40A) are integrally formed to this base plate 21, there is a low possibility that the resin caulked portions 41 (41A) are deformed. As a result, reliability in holding the diode 80 is improved. At this time, since the heat radiation plate 90A is held together with the diode 80 between the large-diameter resin caulked portion 41A and the base plate 21, it is not necessary to separately provide a fixing means for fixing the heat radiation plate 90A, wherefore the configuration is simplified.

In addition, since the base plate 21 is made of at least one material selected from PBT (polybutylene terephthalate) and PPS (polyphenylene sulfide), the deformation of the base plate 21 including the resin caulked portions 41 (41A) due to thermal influence is reliably prevented. In this case, since the base plate 21 contains the reinforcing material such as glass fibers, the deformation of the base plate 21 is more reliably prevented.

Further, since the outer plate 22 is made of at least one material selected from PPO (polyphenylene oxide), PPE (polyphenylene ether) and PVC (polyvinyl chloride), it is excellent in weather resistance and hydrolysis resistance. Further, by forming the base plate 21 and the outer plate 22 in an appropriate function-sharing manner, the quality of the terminal box 10 is further improved.

Furthermore, when the outer plate 22 is mounted on the base plate 21, the pressing pieces 33 are arranged to be able to come into contact with the outer surfaces of the terminal plates 90 to reliably prevent the lifting of the terminal plates 90. In this case, since the pressing pieces 33 are integrally formed to the outer plate 22, a cost increase is suppressed as compared with the case where the pressing pieces 33 are formed separately from the outer plate 22 and the like. In addition, since the base plate 21 has higher heat resistance than the outer plate 22, the outer plate 22 not supporting the diode 80 is hardly thermally damaged and the deformation of the pressing pieces 33 is prevented. As a result, the lifting of the terminal plates 90 is reliably prevented by the pressing pieces 33.

Furthermore, since the areas of the terminal plates 90 equal to or more than halves the entire areas in the width direction are the pressing areas 98 covered by the pressing pieces 33, the lifting of the terminal plates 90 is more reliably prevented.

The present invention is not limited to the above described and illustrated embodiment. For example, the following embodiments are also included in the technical scope of the present invention.

The heat radiation plate may be made of a plate material not having a function as the terminal plate (electrically connecting function).

Intermediate terminal plate(s) not connected to the cables may be supported on the base plate and the diode may be mounted between the respective terminal plates and the intermediate terminal plate or between adjacent intermediate terminal plates.

The entire box main body including the base plate may be made of a material which has high heat resistance and whose heat distortion temperature is 170° C. or higher.

The resin caulked portions may be formed by being heated and deformed by an ultrasonic oscillator.

The invention claimed is:

1. A terminal box for solar cell module to be attached to a solar cell module, comprising;
    a plurality of terminal plates;
    a rectifying element which is connected to two corresponding ones of the terminal plates and includes a heating part;
    a base plate which is in the form of a flat plate for supporting the terminal plates and the rectifying element;
    an outer plate which has lower heat resistance than the base plate and is in the form of a frame surrounding the base plate and to which the base plate is mounted and fixed; and
    a pressing piece which is united with the outer plate and can come into contact with the outer surfaces of the terminal plates as the base plate is mounted to the outer plate, thereby preventing the lifting of the terminal plates from the base plate.

2. The terminal box of claim 1, wherein a pressing area of the terminal plate covered by the pressing piece is equal to or more than half the entire area of the terminal plate in a width direction.

3. The terminal box of claim 2, wherein the terminal plates are held between the pressing piece and the base plate in a state where the base plate is mounted to the outer plate.

4. The terminal box of claim 3, wherein the base plate is slid and mounted to the outer plate.

5. The terminal box of claim 3, wherein the terminal plates are placed on left and right supporting areas of the base plate, the outer plate is defined by both left and right side walls and front and rear walls, the base plate is slidable in forward and backward directions relative to the outer plate, and the pressing piece projects into an internal space from the inner surface of each of the both side walls.

6. The terminal box of claim 5, wherein one of the respective terminal plates serves as a heat radiation plate which has a larger surface area than the other terminal plate and supports the rectifying element, and one of the respective pressing pieces has a larger width in forward and backward directions than the other pressing piece and prevents the lifting of the heat radiation plate.

7. The terminal box of claim 6, wherein the base plate is formed with a slide portion, the outer plate is formed with a slide receiving portion which slides along the slide portion at the time of sliding and mounting the base plate, and the pressing piece is integrally coupled to the slide receiving portion.

8. The terminal box of claim 7, wherein the base plate is formed with projections, each terminal plate is formed with a hole, a leading end part of each projection is inserted into the hole to come out at the outer side of the terminal plate and deformed by applying resin caulking to form a resin caulked portion for holding the terminal plate between the resin caulked portion and the base plate, and the resin caulking is applied in a state where the lifting of the terminal plates is prevented by the pressing piece.

9. The terminal box of claim 1, wherein the base plate is made of at least one material selected from PBT (polybutylene terephthalate) and PPS (polyphenylene sulfide).

10. The terminal box of claim 1, wherein the outer plate is made of at least one material selected from PPO (polyphenylene oxide), PPE (polyphenylene ether) and PVC (polyvinyl chloride).

11. The terminal box of claim 5, wherein the base plate is formed with a slide portion, the outer plate is formed with a slide receiving portion which slides along the slide portion at the time of sliding and mounting the base plate, and the pressing piece is integrally coupled to the slide receiving portion.

12. The terminal box of claim 11, wherein the base plate is formed with projections, each terminal plate is formed with a hole, a leading end part of each projection is inserted into the hole to come out at the outer side of the terminal plate and deformed by applying resin caulking to form a resin caulked portion for holding the terminal plate between the resin caulked portion and the base plate, and the resin caulking is applied in a state where the lifting of the terminal plates is prevented by the pressing piece.

13. The terminal box of claim 5, wherein the base plate is formed with projections, each terminal plate is formed with a hole, a leading end part of each projection is inserted into the hole to come out at the outer side of the terminal plate and deformed by applying resin caulking to form a resin caulked portion for holding the terminal plate between the resin caulked portion and the base plate, and the resin caulking is applied in a state where the lifting of the terminal plates is prevented by the pressing piece.

* * * * *